3,236,682
PROCESS FOR PREPARATION OF CAUSTIC-RESISTANT CONTAINERS FOR HIGH-TEMPERATURE USE
Lee N. Ballard and Willis A. Calhoun, Rolla, Mo., assignors to the United States of America as represented by the Secretary of the Interior
No Drawing. Filed Dec. 28, 1962, Ser. No. 248,160
10 Claims. (Cl. 117—127)
(Granted under Title 35, U.S. Code (1952), sec. 266)

The invention herein described and claimed may be manufactured and used by or for the Government of the United States of America for governmental purposes without the payment of royalties thereon or therefor.

This invention is concerned with vessels which are refractory to fused caustics at high temperatures and the manufacture thereof.

Metallurgical operations frequently involve sintering or fusion of mineral constituents in the presence of a high percentage of caustic materials at temperatures up to and beyond 1100° C. Such operations require the use of a vessel or container which is resistant to the corrosive chemical attack of the fused materials, which will not spall or peel and will withstand the thermal shock of the change from atmospheric temperature to a furnace temperature of 1100° C. and greater or the change from furnace temperature to room temperature.

One application of such operation is in alumina extraction from a mixture of high-iron bauxitic material which requires sintering at 950° to 1100° C. for about 1 hour with about 20 percent by weight of sodium hydroxide and about 20 percent by weight of calcium oxide. Conventional stainless steel crucibles can be used for only one firing in this process, as excessive spalling of the crucible occurs after the first firing. Since the crucibles have to be discarded after one firing, their use is obviously expensive as well as technically unreliable, because of contamination of the sample by spalled flakes from the crucible.

Fireclay, porcelain, zirconium and graphite crucibles have also been found to be unsatisfactory due to absorption of charge, cracking, excessive spalling, oxidation of the crucible or reduction of the charge (in case of graphite).

It is, accordingly, the object of the present invention to prepare a reliable and economical crucible or similar reaction vessel which can be used satisfactorily for reactions of caustic materials with ores, minerals or other metallurgical materials at high temperature.

It has now been found that this objective may be achieved by coating a nickel crucible with a ferric oxide composition. The coating composition comprises ferric oxide in major amount, an alkaline earth metal oxide and an alkali metal hydroxide and is prepared by adding sufficient water to a finely divided mixture of the three ingredients to form a slurry having about the consistency of paint. The exact proportions of the ingredients are not critical but best results have been obtained with proportions of ferric oxide of 93.0 to 95.0 percent, alkaline earth metal oxide 4.8 to 6.5 percent and alkali metal hydroxide 0.2 to 0.5 percent.

A thin coating of this mixture is then applied inside and outside the crucible with a soft bristle brush or by dipping. The coated crucible is then air dried for about 4 hours, oven dried for about 1 hour at about 110° C. and then heated in air for about 1 hour at about 1400° C. Three such coating-drying-heating cycles have been found to give a very satisfactory coating though a greater or lesser number of such cycles may be found to be optimum for a particular vessel, its intended use and particular coating composition.

The temperatures employed in coating are also not critical and vary over a considerable range, again depending on the nature of the vessel to be coated and its use as well as the coating composition.

The purpose of the ferric oxide is to form a basic surface that is resistant to caustic and oxidation attack. The alkaline earth metal oxide and alkali metal hydroxide serve as fluxes to lower the incipient fusion point of the mixture, provide bonding between the coating constituents and give a smooth vitrified finish.

X-ray diffraction patterns of both the outside black coating and that portion next to the crucible indicate that some preferred orientation is present, with ($h$00) parallel to Ni. The black surface appears to be $$NiO + NiFe_2O_4$$

while the material at the interface gave a diffraction pattern that showed the major constituent to be NiO, with $NiFe_2O_4$ present in lesser amounts.

Relatively pure ferric oxide must be used to prevent introduction of impurities that might cause bloating or cracking when fired at high temperatures. Commercial ferric oxide sold under the name of "jewelers' rouge," a precipitated ferric oxide, has been found to be very satisfactory for use in the invention because of its purity and because its very fine texture permits extraordinarily good mixing with other ingredients. Other forms of ferric oxide may, however, be used provided they are sufficiently pure and in a physical form suitable for mixing with the other ingredients.

The following examples will serve to more particularly describe the invention.

*Example 1*

Distilled water was added to a mixture of 93.0 percent ferric oxide (jewelers' rouge), 6.5 percent CaO and 0.5 percent NaOH in an amount sufficient to form a slurry having about the consistency of paint. The CaO was a powder of analytical reagent grade of 90% available CaO quality; the NaOH was an electrolytic type of 99.4 percent NaOH content.

A nickel crucible was coated with the slurry, dried at room temperature for 4 hours, then at 110° C. for 1 hour and finally in air at 1400° C. for 1 hour. Three such coating, drying, and firing cycles resulted in a satisfactorily coated crucible. The thus prepared crucible was used in sintering a 100 gram mixture containing 62.6 weight percent high-iron bauxite with 18.6 weight percent CaO and 18.8 weight percent NaOH for 1 hour at temperatures of 900° C., 950° C. and 1100° C. In each instance the crucible was not attacked by the caustic charge and was satisfactory in every respect.

The same coated crucible was used to calcine a 100-gram charge of high-iron bauxite mixed with 50 grams of NaOH for 1 hour at 900° C. The charge fused and upon cooling formed a solid mass, causing no damage to the crucible.

Though distilled water was used in the example and is preferred, any clean water, free from added chemicals, could be used.

*Examples 2–5*

$Fe_2O_3$–CaO–NaOH coatings as described in Example 1 were applied to iron, zirconium, molybdenum and titanium crucibles by the same procedure as that employed in Example 1. These coated crucibles all proved unsatisfactory due to cracking and spalling and resultant contamination of the samples.

Examples 6–11

Various crucibles were used to calcine the same high-iron bauxite with a CaO–NaOH mixture as employed in Example 1 at 900° C. with the following results:

(1) *Stainless steel and iron crucibles.*—Oxidized metal flakes spalled from the crucible, contaminating the sample.

(2) *Nickel crucible.*—The NaOH attacked the crucible, contaminating the sample.

(3) *Magnesia crucible.*—The caustic charge attacked the crucible, and a portion of the charge was absorbed into the crucible.

(4) *Zirconium crucible.*—The crucible failed by cracking.

(5) *Silicon nitride boat.*—Boat was attacked by the caustic charge, and it cracked.

(6) *Graphite crucible.*—Changed the composition of the charge by reducing the iron to metal.

The distinct advantages of applicants' process and article are apparent from the results of the above examples.

What is claimed is:

1. A method for preparing a coated nickel reaction vessel resistant to caustic materials at high temperature comprising coating the nickel vessel with an aqueous slurry of a mixture of ferric oxide in a major amount, an alkaline earth metal oxide and an alkali metal hydroxide; and drying and calcining the coated vessel to form a caustic resistant coating thereon.

2. Method of claim 1 in which the reaction vessel is a crucible.

3. Method of claim 1 in which water is added to a mixture of about 93.0 percent ferric oxide, about 6.5 percent alkaline earth metal oxide and about 0.5 percent alkali metal hydroxide in an amount to form said slurry with a consistency about that of paint.

4. Method of claim 1 in which the ferric oxide is jewelers' rouge.

5. Method of claim 1 in which the alkaline earth oxide is calcium oxide.

6. Method of claim 1 in which the alkali metal hydroxide is sodium hydroxide.

7. Method of claim 1 in which the coated vessel is dried at room temperature for about 4 hours and at about 110° C. for about 1 hour.

8. Method of claim 1 in which the coated and dried vessel is calcined for about 1 hour at about 1400° C.

9. Method of claim 1 in which the coating, drying and calcining cycle is carried out a total of three times.

10. A coated nickel reaction vessel prepared according to the method of claim 1.

References Cited by the Examiner

UNITED STATES PATENTS

| | | |
|---|---|---|
| 152,148 | 6/1874 | Milligan. |
| 2,195,436 | 4/1940 | Weller _____ 263—48 |
| 2,916,389 | 12/1959 | McAllister. |

RICHARD D. NEVIUS, *Primary Examiner.*

JOSEPH B. SPENCER, *Examiner.*

J. R. BATTEN, *Assistant Examiner.*